(12) United States Patent
Ma

(10) Patent No.: US 8,189,569 B2
(45) Date of Patent: May 29, 2012

(54) APPARATUS AND METHOD FOR REALIZING USER SWITCHING BETWEEN IP NETWORK AND PSTN NETWORK

(75) Inventor: Jinyong Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1375 days.

(21) Appl. No.: 11/579,120

(22) PCT Filed: Nov. 23, 2005

(86) PCT No.: PCT/CN2005/001978
§ 371 (c)(1),
(2), (4) Date: Apr. 23, 2007

(87) PCT Pub. No.: WO2006/066482
PCT Pub. Date: Jun. 29, 2006

(65) Prior Publication Data
US 2007/0280288 A1    Dec. 6, 2007

(30) Foreign Application Priority Data
Dec. 23, 2004   (CN) .......................... 2004 1 0102478

(51) Int. Cl.
| H04L 12/66 | (2006.01) |
| H04L 12/413 | (2006.01) |
| H04J 3/12 | (2006.01) |
| H04M 1/24 | (2006.01) |
| H04M 3/08 | (2006.01) |
| H04M 11/00 | (2006.01) |
| H04M 3/42 | (2006.01) |
| H04M 7/00 | (2006.01) |

(52) U.S. Cl. ........ 370/353; 370/354; 370/355; 370/356; 370/467; 370/526; 379/93.09; 379/100.09; 379/100.12; 379/100.13; 379/100.14; 379/100.15; 379/207.05; 379/207.06; 379/207.07; 379/207.08; 379/221.01; 379/221.11

(58) Field of Classification Search .................. 370/467
See application file for complete search history.

(56) References Cited

U.S. PATENT DOCUMENTS
5,153,908 A  * 10/1992 Kakizawa et al. ............ 379/157
(Continued)

FOREIGN PATENT DOCUMENTS
CN         1287451 A        3/2001
(Continued)

OTHER PUBLICATIONS

Written Opinion of the International Searching Authority dated Mar. 2, 2006 in connection with Internatiuonal Patent Application No. PCT/CN2005/001978.

*Primary Examiner* — Nishant B Divecha

(57) ABSTRACT

An apparatus for switching a user between an IP network and a PSTN is disclosed in the present invention and includes a user port, a Subscriber Line Interface Circuit, a detection circuit, a PSTN port, an IP network interface circuit and an action unit. A method for switching a user between the IP network and the PSTN is also disclosed. According to the method, the action unit is controlled by the control signal from a CPU, thereby implementing the user switching between the IP network and the PSTN on the apparatus. The apparatus and the method enable one or more users to switch between the IP network and the PSTN, implements flexible user selection between the two networks and offers user communication backup when failure occurs. Accordingly, the present invention increases the satisfaction of users and the core competence of enterprises.

8 Claims, 4 Drawing Sheets

U.S. PATENT DOCUMENTS

| | | | |
|---|---|---|---|
| 5,740,241 A * | 4/1998 | Koenig et al. | 379/399.01 |
| 6,282,192 B1 * | 8/2001 | Murphy et al. | 370/352 |
| 6,327,258 B1 * | 12/2001 | Deschaine et al. | 370/356 |
| 6,826,278 B2 * | 11/2004 | Kiykioglu | 379/399.01 |
| 2001/0046237 A1 | 11/2001 | Chan et al. | |
| 2002/0164003 A1 * | 11/2002 | Chang et al. | 379/93.05 |
| 2004/0017901 A1 | 1/2004 | Lim | |
| 2004/0037265 A1 | 2/2004 | Huang et al. | |
| 2006/0013195 A1 | 1/2006 | Son et al. | |

FOREIGN PATENT DOCUMENTS

| | | |
|---|---|---|
| CN | 1471296 A | 1/2004 |
| WO | WO 03/103259 A1 | 12/2003 |
| WO | WO 2004/091181 A2 | 10/2004 |

* cited by examiner

APPARATUS AND METHOD FOR REALIZING USER SWITCHING BETWEEN IP NETWORK AND PSTN NETWORK

FIELD OF THE INVENTION

The present invention relates to network switching technology, and particularly, to an apparatus and a method for realizing a user switching between an Internet Protocol (IP) network and a Public Switched Telephone Network (PSTN).

BACKGROUND OF THE INVENTION

Along with the rapid development of the IP technology in recent years, traditional telecommunications networks are evolving into the Next Generation Network (NGN) gradually. More and more portable access devices such as integrated access devices (IAD) and IP intelligent terminals are applied, while the PSTN will still remain a long time. When the two network systems are used synchronously, it is very important to implement switching from the IP network to the PSTN for portable access devices such as IADs and IP intelligent terminals used in the IP network. The ability of switching freely between the two networks enables users to select networks freely and thus increases the satisfaction of users and thus enhances the competence of enterprises. So, the objective of switching between the two networks freely has become a new concern of more and more various telecommunication operators.

At present, IADs and IP intelligent terminals are generally connected to the IP network and the PSTN simultaneously, and are switched between the two networks by controlling on/off operations of a relay.

FIG. 1 shows a schematic diagram of a switching circuit for a user port switching between the two networks. The circuit shown in FIG. 1, also called a Subscriber Emergency Circuit or a backup circuit, is a part of the circuits of an access device. The switching circuit in the prior art shown in FIG. 1 includes: 1) a detection circuit 1 for detecting the ring status of the PSTN port; 2) a detection circuit 2 for detecting the off-hook status and the line status of the PSTN port; 3) a relay A which is the core component for user switching between the IP network and the PSTN.

FIG. 1 also includes a user port 1 and a user port 2 for connecting user terminals; PSTN port for connecting switches; Subscriber Line Interface Circuits 1 and 2, which are also called BORSCHT function circuits according to their functions, for implementing battery feed-back, over-voltage protection, ring, off-hook supervision, codec, 2-wire/4-wire hybrid and test; and two 10/100 M IP network interface circuits.

In the circuits of FIG. 1, the two terminals of the user port 1 are connected to terminals A1 and A2 of the relay A respectively; terminals A3 and A4 of the relay A are connected to the two outputs of the Subscriber Line Interface Circuit 1 respectively, while the input of the Subscriber Line Interface Circuit 1 is connected to the CPU; terminals A5 and A6 of the relay A are connected to the two inputs of the detection circuit 1 respectively; the terminal, connecting with terminal A6 of the relay A, of the detection circuit 1 is also connected to one terminal of the PSTN port; the terminal, connecting with terminal A5 of the relay A, of the detection circuit 1 is also connected to an input of the detection circuit 2, and the other input of the detection circuit 2 is connected to the other terminal of the PSTN port. An output of the detection circuit 1 sends the detected ring status of the PSTN port to the CPU. An output of the detection circuit 2 sends the detected off-hook status and the line status of the PSTN port to the CPU. Two 10/100M IP network interfaces are connected to the CPU for communication with external devices.

The two terminals of the user port 2 are directly connected to the two outputs of the Subscriber Line Interface Circuit 2, while an input of the Subscriber Line Interface Circuit 2 is connected to the CPU.

The initial status of the relay A refers to the status when the access device powers off. The terminals A1 and A2 of the relay A are connected to the terminals A5 and A6 respectively, which are indicated by dotted lines in FIG. 1. When the user port 1 is connected to a user terminal, e.g., a telephone, the telephone can communicate with the PSTN, as shown in FIG. 1. In other words, when the access device powers off, the user port 1 communicates with others via the PSTN.

When the access device powers on, the CPU controls the actions of the relay A by changing the status of the control signal ACON. For example, the CPU makes the terminals A1 and A2 of the relay A connect to terminals A3 and A4. In this case, if the user port 1 is connected to a telephone, the telephone communicates with other devices via the IP network interfaces connected to the CPU. Here, the control signal from the CPU to the relay A is represented by ACON.

The implementation for the CPU controlling the status of the control signal may be performed in following steps. A control port of the relay communicates with an input/output (I/O) port of the CPU via the control signal. The control signal status is changed by a way of the CPU changing the status of the I/O port, and further controls the connection relationship of the relay terminals. When the CPU does not work, i.e. the CPU powers off, the I/O port has an initial status. When the CPU is powered on, the status of the I/O port may be controlled by setting the status parameter of the I/O port to 0 or 1. For instance, when a control signal ACON is sent to an I/O port of the CPU, in case that the device powers off, the ACON=0, and thus the terminals A1 and A2 of the relay A are connected to the terminals A5 and A6. In case that the device powers on, when the CPU sets the control signal ACON to 1, i.e., ACON=1, the terminals A1 and A2 of the relay A are switched to connect with terminals A3 and A4. In the latter case, i.e., the case that the CPU powers on, the control over the I/O port is relatively fixed and cannot be changed as user desires.

Suppose the user port 1 connects with a telephone and the PSTN connects with a switch, in three working statuses, the working process of the switching circuits in FIG. 1 for a user switching between the IP network and the PSTN is described hereinafter.

The first status is the normal status.

In this case, the access device and the IP network connection work well. When the access device powers on, the CPU may change the status of the control signal ACON, e.g., setting the ACON as ACON=1. The terminals A1 and A2 of the relay A are connected to the terminals A3 and A4 respectively. The telephone communicates with others via one of the 10/100M IP network interfaces connected to the CPU. In this way, the telephone that works well in the IP network cannot be switched to the PSTN.

The second status: the access device powers off.

When the access device powers off, the CPU powers off, and the control signal ACON from the CPU is thus changed to its initial status, e.g., ACON=0. The connections among the terminals of the relay A are changed. The terminals A1 and A2 of the relay A are switched to connect with the terminals A5 and A6 respectively. In this case, the telephone directly connects to a switch connected to the PSTN port and communicates with others via the PSTN.

When the access device recovers, the CPU recovers either. The CPU firstly determines whether the PSTN is idle according to the ring status and the off-hook status fed back by the detection circuits 1 and 2. If the PSTN is idle, the CPU changes the status of the control signal ACON such that the terminals A1 and A2 of the relay A are switched to connect with the terminals A3 and A4 respectively, thereby switching the telephone from the PSTN to the IP network. If the PSTN is busy, the CPU may wait and periodically check the PSTN status. When the CPU detects that the PSTN is idle, it switches the telephone to the IP network.

The third status: IP network failure. The IP network failure is detected by the way of the CPU periodically communicating with a control device (e.g., softswitch) in the IP network side. When the CPU detects that the communication is time out, it regards that an IP network failure occurs.

When the access device works well, i.e. the CPU is in the normal working status, if the CPU detects an IP network failure, it changes the control signal ACON from the CPU to switch the terminals A1 and A2 of the relay A to connect with the terminals A5 and A6, thereby switching the telephone to the PSTN.

When the IP network recovers, the CPU firstly determines whether the PSTN is idle according to the ring status and the off-hook status fed back by the detection circuits 1 and 2. If the PSTN is idle, the CPU changes the status of the control signal ACON such that the terminals A1 and A2 of the relay A are switched to connect with the terminals A3 and A4 respectively, thereby re-switching the telephone from the PSTN to the IP network. If the PSTN is busy, the telephone may not be switched to the IP network until the CPU detects that the PSTN is idle.

In view of the above, when the power supply is disconnected, i.e. when the CPU powers off, the user line may communicate with the PSTN line and the user telephone is directly communicated to the switch of the PSTN. When the power supply recovers, i.e. when the CPU recovers, if the PSTN is idle, the user may be switched back to the IP network. If the PSTN is busy, the user cannot be switched back until the PSTN is idle. In normal cases, when an IP network failure is detected, the switching will be triggered and implemented automatically; and when it is detected that the IP network recovers and the PSTN is idle, the user will be switched to the IP network forwardly.

Furthermore, when the access devices, e.g. IADs and IP intelligent terminals, power off or when an IP network failure occurs, the user is triggered to be switched between the IP network and the PSTN. However, in the normal working status, the user cannot switch between the IP network and the PSTN as his desires.

In addition, in the above solution, the switching circuit is difficult to switch multiple users, but only one user between the IP network and the PSTN.

SUMMARY OF THE INVENTION

In view of the above, an embodiment of the present invention provides an apparatus for users switching between the IP network and the PSTN. The apparatus features simple structure and supports users to switch between the IP network and the PSTN in various working statuses.

An embodiment of the present invention also provides a method for users switching between the IP network and the PSTN. By utilizing the method, multiple users can be switched in a flexible way between the IP network and the PSTN in various working statuses.

The apparatus in accordance with the present invention includes a user port, for connecting an user device; an IP network interface circuit, for accessing an IP network; a PSTN port, for accessing a Public Switched Telephone Network (PSTN); a Subscriber Line Interface Circuit connected to a CPU and thus connected to the IP network interface circuit; a detection circuit connected to the PSTN port and for detecting the line status and sending the detection result to the CPU, and an action unit, connected to the user port, the Subscriber Line Interface Circuit and one terminal of the PSTN port, for receiving a control signal from the CPU and controlling the user port to communicate with the IP network interface circuit or the PSTN port to access the IP network or the PSTN according to the control signal; where the other terminal of the PSTN port connects to one input of the detection circuit and the other input of the detection circuit connects to the action unit.

The method in accordance with the present invention includes the following steps. Determine whether a request of switching from the IP network to the PSTN is detected first. If the request is detected, a user port may be controlled to communicate with the PSTN port and to access the PSTN. And determine whether the user port can switch to the IP network. If the request is not detected, the process of determining whether a request of switching a user port from the IP network to the PSTN is detected may be repeated.

If the user port can switch to the IP network, the user port may be controlled to communicate with the IP network interface and to access the IP network, and the process of determining whether a request of switching from the IP network to the PSTN is detected may be repeated. If the user port can not switch to the IP network, the process of determining whether the user port can switch to the IP network may be repeated.

As shown in the above technical solutions, an action unit and a holding circuit are added to the user switching circuit for controlling the users to access different networks. Both in the case of the user initiating a request and in the case of an IP network failure occurring, what needed is only sending a corresponding control signal to the action unit by the CPU to implement switching the user between the IP network and the PSTN. When the access device powers off, the user can be automatically switched between the IP network and the PSTN. According to the technical solution of the present invention, multiple IP network users can be switched, also called backed up, to one or more PSTN lines. As such, switching the user between the IP network and the PSTN implements a flexible user selection between the two networks and offers user communication backup when network failure occurs, thereby increasing the satisfaction of users.

DETAILED DESCRIPTION OF THE INVENTION

In the above solution, connection states of the relay are controlled to realizing the user switching between an IP network and a PSTN network. However, in following preferred embodiments of the invention, a CPU is used to control an action unit and detect the PSTN lines. When the user initiates a request and when an IP network failure occurs, flexible user switching between the IP network and the PSTN can be implemented only by sending corresponding control signals by the CPU to the action control unit. And when the device powers off, the user can be automatically switched between the IP network and the PSTN. Particularly, due to the added holding circuit, the user is able to switch between the IP network and the PSTN as he desires even when the access device and the IP network work well. By using the method of the present invention, not only a single user, but also two or more users can switch between the IP network and the PSTN.

To make the technical solutions and merits of the present invention more apparent, the present invention will be described in details with reference to the accompanying drawings and preferred embodiments hereinafter.

Figure 1:
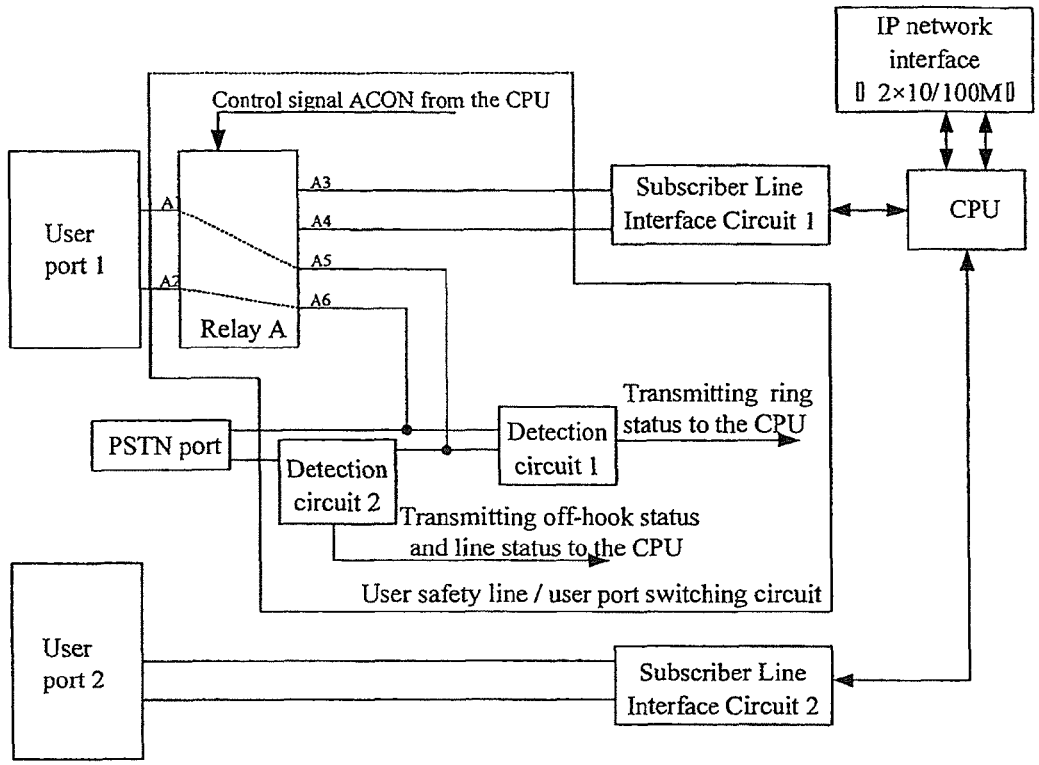
FIG. 1 is a schematic diagram illustrating the connections of the user port switching circuit according to known technologies.
Figure 2:
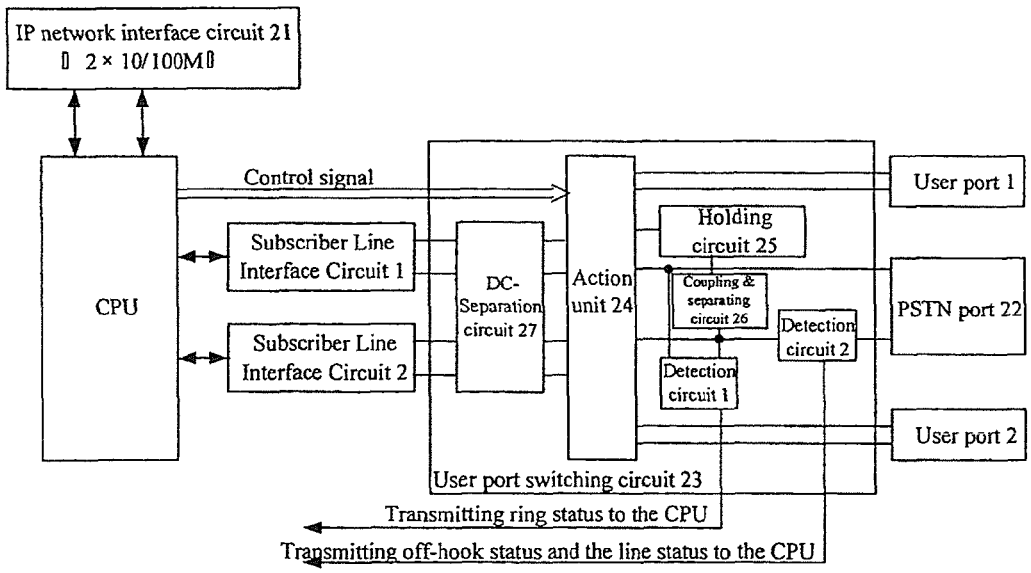
FIG. 2 is a schematic diagram illustrating the connections of an apparatus that switches two users between the IP network and the PSTN according to an embodiment of the present invention.

FIG. 2 shows a schematic diagram illustrating the connections of the device that switches two users between the IP network and the PSTN. In FIG. 2, the user terminals 1 and 2 as well as the Subscriber Line Interface Circuits 1 and 2 all connect to the action unit 24. The action unit 24 directly receives the control signals from the CPU. A first terminal of the PSTN port 22 connects to the action unit 24 while a second terminal connects to a first terminal of the detection circuit 2. A second terminal of the detection circuit 2 connects to the action unit 24 and thus the PSTN port 22 can communicate with the action unit 24 through the detection circuit 2. The second terminal of the detection circuit 2 also connects to a first input of the detection circuit 1. The second input of the detection circuit 1 connects to the first terminal of the PSTN port 22 and thus connects to the action unit 24. An output of the detection circuit 1 sends the detected ring status of the PSTN port to the CPU while an output of the detection circuit 2 sends the detected off-hook status and line status of the PSTN port to the CPU. The CPU connects to two external 10/100M IP network interfaces 21 for communication. A first terminal of the holding circuit 25 connects to the action unit 24. In an embodiment of the present invention, a second terminal of the holding circuit 25 connects to the first terminal of detection circuit 1 to which the detection circuit 2 connects. Here, the IP network interface circuit 21 includes two 10/100M IP network interfaces.

Moreover, in an embodiment of the present invention, to enhance the reliability of the circuits, a coupling & separating circuit 26 consisting of transformers and capacitances for coupling alternating current signals and separating DC signals, as well as a DC-separation circuit 27 consisting of capacitance for separating DC signals may be added.

In FIG. 2, action unit 24, holding circuit 25, detection circuits 1 and 2, coupling & separating circuit 26 and DC-separation circuit 27 constitute the user port switching circuit 23. The user ports 1 and 2 constitute the user port. The Subscriber Line Interface Circuits 1 and 2 constitute the Subscriber Line Interface Circuit. The PSTN port 22 and the IP network interface circuit 21 constitute a network interface circuit. The detection circuits 1 and 2 constitute a detection circuit. One end of the coupling & separating circuit 26 connects to the holding circuit 25 while the other end connects to the first terminal of the detection circuit 1 and the second terminal of the detection circuit 2. The DC-separation circuit 27 connects the Subscriber Line Interface Circuit and the action unit in series.

Figure 3:
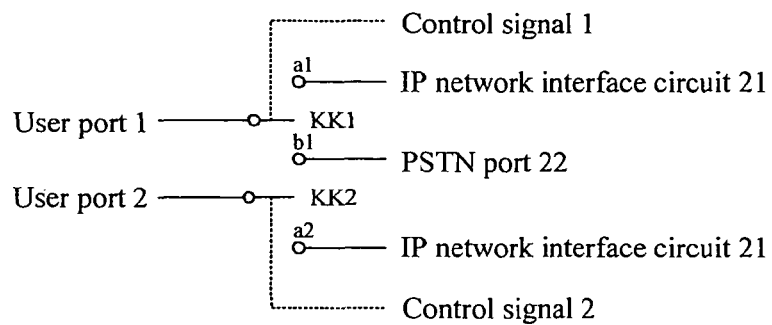
FIG. 3 is a schematic diagram illustrating the logic structure of the action unit of FIG. 2.

Compared with the prior art, in the embodiments of the present invention, the relay A is replaced by the action unit 24 that is special for switching the user port between the IP network and the PSTN. FIG. 3 shows a logic structure of the action unit 24 of FIG. 2. As shown in FIG. 3, the connections of the switches KK1 and KK2 can be controlled by the control signals from the CPU. When the CPU sets the control signal 1 to be at electrical level "0", for example, the switch KK1 connects to a terminal a1 and thus the user port 1 connects to the IP network for communication. When the CPU sets the control signal 1 to be at electrical level "1", the switch KK1 connects to a terminal b1, and thus the user port 1 connects to the PSTN for communication. Analogously, by controls from the CPU on the control signal 2, the communication of the user port 2 in the IP network or in the PSTN may be implemented. Here, the change of the control signal may be triggered either by system failure such as a failure when the access device powers off or an IP network failure, or by the user's request for enabling the CPU to issue instructions to change the control signal status, e.g., in the case of the user dialing a special number.

A holding circuit 25 is also added in the present invention to ensure the communication quality during the switching. When the user performs a communication in the IP network, for example, if he needs to switch to the PSTN from the IP network, the holding circuit 25 simulates the user off-hook signal hold such that the user can not hear the DTMF dialing sound from the CPU, thereby increasing the satisfaction of the user.

In view of the above, in the present invention, the action unit 24 in the user port switching circuit 23 is controlled by the control signals from the CPU to implement the switch of the user between the IP network and the PSTN in different working status.

To implement the functions, the action unit 24 may consist of physical switch components such as relays and/or photocoupler switches; or may consist of logical components; or may consist of physical-logical mixed switch circuits including partial physical switch components and partial logical components. The logical components may be programmable logical control chips, or logic-gate circuits with control functions.

Figure 4:
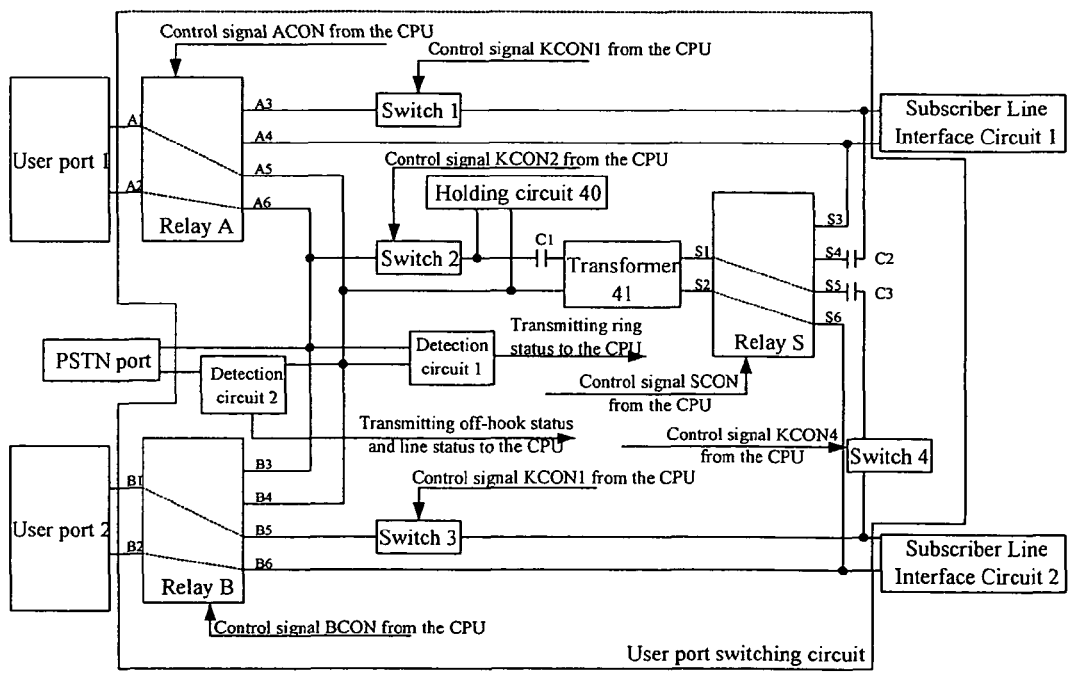
FIG. 4 is a schematic diagram illustrating the connections of the user port switching circuit of FIG. 2.

The constitution and connections of the user port switching circuit in the present invention will be described in details below with reference to an embodiment wherein the action unit 24 consists of relays and photocoupler switches. FIG. 4 shows the schematic connections of the user port switching circuit of FIG. 2.

As shown in FIG. 4, the user port switching circuit according to an embodiment of the present invention includes: 1) detection circuit 1 for detecting the ring status of the PSTN port; 2) detection circuit 2 for detecting the off-hook status and line status of the PSTN port; 3) holding circuit 40 for holding the off-hook signal at the PSTN port; 4) action unit 24 comprising relay A, relay B, relay S, switch 1, switch 2, switch 3 and switch 4.

FIG. 4 also shows the user ports 1 and 2 for connecting external user terminals, the PSTN port for connecting external switch devices, the Subscriber Line Interface Circuits 1 and 2 for battery feed-back, over-voltage protection, ring, off-hook supervision, codec, 2-wire/4-wire hybrid and test, and two 10/100M IP network interface circuits.

Furthermore, to increase the reliability of the circuits, transformer 41, capacitances C1, C2 and C3 are also added into the user port switching circuit in FIG. 4. The transformer 41 is used for coupling alternating current DTMF, and capacitances C1, C2 and C3 are used for separating DC signals.

According to their different functions, the circuits in FIG. 4 may include several function circuits as follows:

(1) A circuit for switching the user port, including relay A, relay B, switch 1 and switch 3, wherein the relay A cooperates with the switch 1 to implement the switching of the user port 1, and the relay B cooperates with the switch 3 to implement the switching of the user port 2.

(2) A circuit for holding includes the holding circuit 40.

(3) An access control circuit for controlling the holding circuit including the switch 2, switch 4 and relay S. The switch 2 controls the connection between the holding circuit 40 and the PSTN. The switch 4 controls the connection between the Subscriber Line Interface Circuit 2 and the holding circuit 40. The relay S controls the connection between the Subscriber Line Interface Circuit 1 and the holding circuit 40;

(4) A coupling & separation circuit including transformer 41 and capacitance C1. The transformer 41 is used for coupling alternating current DTMF and the capacitances C1 is used for separating DC signals between the transformer 41 and the switch 2. It will be appreciated by one of ordinary skill in the art that the coupling & separating circuit can be established with components or combination of components other than the ones mentioned here, and the invention does not limit the establishment method.

(5) A DC-separation circuit including capacitances C2 and C3 which are used for separating DC signals between the Subscriber Line Interface Circuits 1 and 2 and the relay S. It will be appreciated by one of ordinary skill in the art that the DC-separation circuit can be established with components or combination of components other than the ones mentioned here, and the invention does not limit the establishment method as long as the DC signal separation function is achieved.

(6) PSTN lines and a status detection circuit including the detection circuit 1 and the detection circuit 2.

The circuits described in above items (1), (2), (3), (4) and (5) are added according to the invention.

The connections among the circuits shown in FIG. 4 are described herein.

The two terminals of user port 1 connect to the terminals A1 and A2 of the relay A respectively. The terminal A3 of the relay A connects to one end of the switch 1 and the other end of the switch 1 connects to the first output of the Subscriber Line Interface Circuit 1, and thus the terminal A3 of the relay A connects to the first output of the Subscriber Line Interface Circuit 1 via the switch 1. The terminal A4 of the relay A directly connects to the second output of the Subscriber Line Interface Circuit 1.

The terminals A5 and A6 of the relay A connect to the first input and the second input of the detection circuit 1 respectively. The second input of the detection circuit 1, which connects to the terminal A6 of the relay A, also connects to the first terminal of the PSTN port. The first input of the detection circuit 1, which connects to the terminal A5 of the relay A, also connects to the first input of the detection circuit 2 while the second input of the detection circuit 2 connects to the second terminal of the PSTN port. The output of the detection circuit 1 sends the detected ring status of the PSTN port to the CPU, and the output of the detection circuit 2 sends the detected off-hook status and line status of the PSTN port to the CPU. The CPU connects to the externally 10/100M IP network interfaces including two 10/100M IP network interfaces.

The two terminals of the user port 2 connect to the terminals B1 and B2 of the relay B respectively. The terminal A5 of the relay B connects to one end of the switch 3 and the other end of the switch 3 connects to the first output of the Subscriber Line Interface Circuit 2, and thus the terminal A5 of the relay B connects to the first output of the Subscriber Line Interface Circuit 2 via the switch 3. The terminal A6 of the relay B directly connects to the second output of the Subscriber Line Interface Circuit 2.

The terminal B3 of the relay B connects to the terminal A6 of the relay A. The terminal B4 of the relay B connects to the first input of the detection circuit 1 to which the detection circuit 2 connects.

The two inputs, i.e. the first input and the second input, of the transformer 41 connect to the terminals S1 and S2 of the relay S respectively. A first output of the transformer 41 connects to one end of the capacitance C1 in series while the other end of the capacitance C1 connects to one end of the switch 2. The other end of the switch 2 connects to the first terminal of the PSTN port to which the detection circuit 1 connects. The second output of the transformer 41 connects to the first input of the detection circuit 1 to which the detection circuit 2 connects. One end the holding circuit 40 connects to the end of the capacitance C1 to which the switch 2 connects, and the other end of the holding circuit 40 connects to the first input of the detection circuit 1 to which the detection circuit 2 connects.

The terminal S3 of the relay S connects to the second output of the Subscriber Line Interface Circuit 1 to which the terminal A4 of the relay A connects. The terminal S4 of the relay S connects to one end of the capacitance C2 and the other end of the capacitance C2 connects to the first output of the Subscriber Line Interface Circuit 1 to which the switch 1 connects, and thus the terminal S4 of the relay S connects to the first output of the Subscriber Line Interface Circuit 1 via the capacitance C2. The terminal S6 of the relay S connects to the second output of the Subscriber Line Interface Circuit 2 to which the terminal B6 of the relay B connects. The terminal S5 of the relay S connects to one end of the capacitance C3 and the other end of the capacitance C2 connects to one end of the switch 4. The other end of the switch 4 connects to the first output of the Subscriber Line Interface Circuit 2 to which the switch 3 connects, and thus the terminal S5 of the relay S connects to the first output of the Subscriber Line Interface Circuit 2. The operation of the user port switching circuit is explained hereinafter with reference to an embodiment with two users switching between the IP network and the PSTN as well as the connections shown in FIG. 2 and FIG. 4.

Suppose the user port 1 connects to a telephone 1, the user port 2 connects to a telephone 2 and the PSTN port connects to office switch devices such as switches.

For clearly describing the working status of the operative components in FIG. 4, the connections corresponding to the initial status and the status that the access device powers on of these movable components are shown in tables.

The connections among the operative components, including relays and photocoupler switches in the user port switching circuit 23 in the initial status, also called the default status, i.e. the status that the access device powers off, are shown as dotted lines in FIG. 4 and the status of these components are also shown in Table 1:

TABLE 1

| Component | Connection or Status |
|---|---|
| Relay A | A1 connects to A5 while A2 connects to A6 |
| Relay B | B1 connects to B5 while B2 connects to B6 |
| Relay S | S1 connects to S2 while S2 connects to S6 |
| Switch 1 | Switched on |
| Switch 2 | Switched off |
| Switch 3 | Switched on |
| Switch 4 | Switched off |

When the access device powers on, the statuses of the operative components such as relays and switches in the user port switching circuit 23 are shown in Table 2:

TABLE 2

| Component | Connection or Status |
|---|---|
| Relay A | A1 connects to A3 while A2 connects to A4 |
| Relay B | B1 connects to B5 while B2 connects to B6 |
| Relay S | S1 connects to S5 while S2 connects to S6 |
| Switch 1 | Switched on |
| Switch 2 | Switched off |
| Switch 3 | Switched on |
| Switch 4 | Switched off |

Before explaining the operation of the switching circuit, suppose the I/O port of the CPU, as an output of control signals, connects to the control signal terminal of each relay. The relationship between the control signal status and the relays or the photocoupler switches are shown in Table 3. The terms ACON, BCON and SCON refers to the control signals corresponding to the relay A, relay B and relay S respectively. The terms KCON1, KCON2, KCON3 and KCON4 refers to the control signals corresponding to switches K1, K2, K3 and K4 respectively.

TABLE 3

| Component | Control Signal Status | Connections or Status |
|---|---|---|
| Relay A | ACON = 0 | A1 connects to A5 while A2 connects to A6 |
| Relay A | ACON = 1 | A1 connects to A3 while A2 connects to A4 |
| Relay B | BCON = 0 | B1 connects to B5 while B2 connects to B6 |
| Relay B | BCON = 1 | B1 connects to B3 while B2 connects to B4 |
| Relay S | SCON = 0 | S1 connects to S5 while S2 connects to S6 |
| Relay S | SCON = 1 | S1 connects to S3 while S2 connects to S4 |
| Switch 1 | KCON1 = 0 | Switched off |
| Switch 1 | KCON1 = 1 | Switched on |
| Switch 2 | KCON2 = 0 | Switched off |
| Switch 2 | KCON2 = 1 | Switched on |
| Switch 3 | KCON3 = 0 | Switched off |
| Switch 3 | KCON3 = 1 | Switched on |
| Switch 4 | KCON4 = 0 | Switched off |
| Switch 4 | KCON4 = 1 | Switched on |

The first status is the normal status.

In the normal status, that is, when the access device and the IP network connection function normally, when the access device powers on, the status of control signal ACON is changed as shown in Table 1 and Table 2. When ACON=1, terminals A1 and A2 of the relay A connect to terminals A3 and A4 of the relay A respectively, the telephone 1 communicates with others through one of the 10/100M IP network interfaces connected to the CPU. Meanwhile, the relay B remains in the initial status, that is, BCON=0, and the telephone 2 communicates with others through one of the 10/100M IP network interface connected to the CPU.

In this case, if the telephone 1 needs to be switched to another communication network, provided the telephone 1 dials a special number, the switching process is described hereinafter:

When CPU receives the complete number, including a special number, sent by the telephone 1, the CPU detects the status of the PSTN line according to the ring status and the off-hook status sent from the detection circuits 1 and 2. If the PSTN line is busy, the CPU remains waiting. If the PSTN line is idle, the CPU sends to the relay A the control signal ACON which is set to be 0, to switch the terminals A1 and A2 of the relay A to connect to the terminals A5 and A6. As such, the telephone 1 is switched from the IP network to the PSTN network.

When the PSTN receives an analog off-hook signal, the CPU sets the control signal KCON2 to 1 to close the switch 2 such that the holding circuit 40 communicates with the PSTN network, and then the CPU resets the control signal ACON to 1 to switch the telephone 1 back to the IP network temporarily. As the holding circuit 40 connects to the PSTN, the analog off-hook status is kept so that the telephone 1 can be switched back to the IP network temporarily. If the holding circuit 40 does not exist, the telephone 1 may not be able to be switched back to the IP network. This is mainly to prevent the user from hearing the analog DTMF dialing voice to increase the satisfaction of the user.

The CPU may set the control signal KCON1 to 0 to disconnect the switch 1 to prevent the user from hearing dialing voice from the CPU. The CPU further changes the control signal SCON to 1 to switch the terminals S1 and S2 of the relay S to connect to the terminals S3 and S4 respectively. That is, the outputs of the Subscriber Line Interface Circuit 1 connect to the holding circuit 40 in a parallel and the analog off-hook status is kept by the holding circuit 40.

Figure 5:
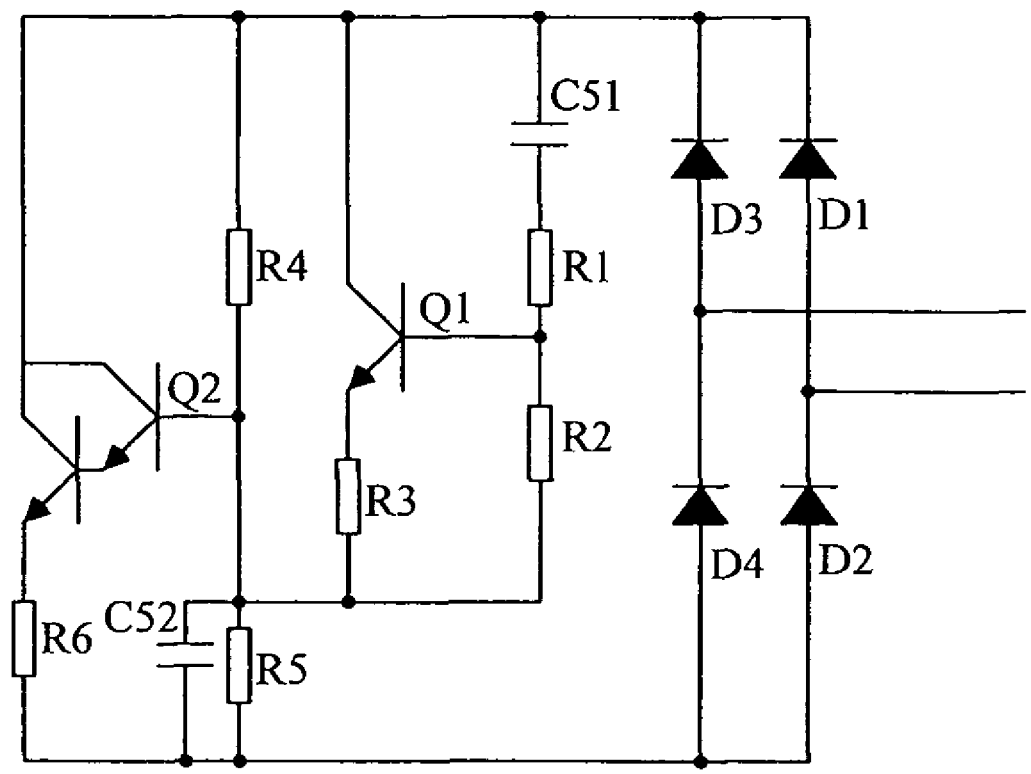
FIG. 5 is a schematic diagram illustrating the circuit diagram of the holding circuit of FIG. 2 and FIG. 3.

FIG. 5 shows a circuit diagram of the holding circuit 40. In FIG. 5, upon rectification by four diodes D1, D2, D3 and D4, the holding circuit 40 keeps an open status; and after a voltage division by a triode, comparatively high current is maintained at the Darlington transistor and finally the resistance R6 is connected in parallel with the Subscriber Line Interface Circuit 1. The voltage of the resistance R6 provides the analog off-hook signal for the PSTN port. The two lines on the right side of FIG. 5 represent two ports of the holding circuit 40, one of which connects to the terminal of the capacitance C1 connected to the switch 2, and the other one connects to the terminal A5 of the relay A. Even when the telephone 1 is already switched back to the IP network, the PSTN line functions normally due to the holding circuit 40. FIG. 5 shows a preferred embodiment of the holding circuit enabling alternating current and DC to show different impedance to filter and attenuate noise. It will be appreciated by one or ordinary skill in the art that, the holding circuit can be established in multiple ways and not limited to the fore-going method. A pure resistance circuit, for example, may also constitute a holding circuit.

Then the CPU removes the special number indicating network switching from the number sent by the telephone 1, and sends the modified number to the transformer 41 in DTMF mode by the Subscriber Line Interface Circuit 1 after a DC signal separation by the capacitance C2. The transformer 41 couples the alternating current DTMF signals to the PSTN line after another DC signal separation by the capacitance C1. When the number is dialed, the CPU changes the control signal ACON to 0 and switches the telephone 1 to the PSTN.

Finally, the CPU changes the control signal KCON2 to 0 to disconnect the switch 2 and the holding circuit 40.

By now, the user is switched from the IP network to the PSTN in normal status.

When the conversation finishes, the telephone 1 is usually switched from the PSTN back to the IP network, since the IP network is usually superior to the PSTN in application. The PSTN is usually used for emergency or special occasions (e.g., when the current communication quality of IP network is very poor). Moreover, a PSTN port is usually shared by several users, thus a user should not occupy the PSTN for a long time.

It is comparatively easy to switch to the IP network from the PSTN. The CPU only needs to control the terminals A1 and A2 of the relay A to connect to terminals A3 and A4, and the turns off the switch 1. The holding circuit 40 is not needed here.

When the telephone 2 dials a special number, similarly, the CPU controls the relay B, switches 2, 3 and 4 to switch the telephone 2 from the IP network to the PSTN. Here the switch 2 still performs the same function. The relay B functions as the relay A. The switch 3 functions as the switch 1 and the switch 4 functions as the relay S.

The second status: the access device powers off.

When the access device powers off, that is, when the CPU powers off, the operative components in the user port switching circuit 23 are in their default status shown in Table 1 & 3: ACON=0, the ports A1 and A2 of the relay A are connected to ports A5 and A6; BCON=0, the ports B1 and B2 of the relay B are connected to ports B5 and B6; SCON=0, the ports S1 and S2 of the relay S are connected to ports S5 and S6; KCON1=1 and KCON3=1, the switches 1 and 3 are switched on; KCON2=0 and KCON4=0, the switches 2 and 4 are switched off.

The telephone 1 is thus switched from the IP network to the PSTN when the access device powers off, and thus obtained a backup communication. Now the outgoing calls from telephone 1 through the user port 1 are all handled by the PSTN while the incoming calls in the PSTN are directed to the user port 1 and answered by telephone 1. It should be noted that under such circumstances the telephone 2 cannot obtain communication backup, that is, the telephone 2 is not able to switch between the IP network and the PSTN.

The third working status: the access device powers off.

When the access device powers off, that is, when the CPU powers off, the movable components of the user port switching circuit 23 stay in default status, as shown in tables 1 and 3. When ACON=0, terminals A1 and A2 of the relay A connect the terminals A5 and A6 of the relay A respectively. Here, BCON=0 and thus terminals B1 and B2 of the relay B connect the terminals B5 and B6 of the relay B respectively; SCON=0 and thus terminals S1 and S2 of the relay S connect the terminals S5 and S6 of the relay S respectively; KCON1=1 and KCON3=1 and thus switches 1 and 3 switch on; KCON2=0 and KCON4=0 thus switches 2 and 4 switch off.

In this way, the telephone 1 is switched from the IP network to the PSTN in the case that the access device powers off, thereby implementing a communication backup. The calls from the telephone 1 are initiated by the user port 1 and are bore in the PSTN lines. And the calls from the PSTN are connected to the user port 1 and received by the telephone 1. It is should be noted that in this case, the telephone 2 can not perform the communication backup, since the telephone 2 can not be switched between the IP network and the PSTN.

The third status: the IP network failure.

When the access device works well, the user port 1 and the user port 2 communicate with others via their own IP network interfaces respectively, which means ACON=1, BCON=0, SCON=0, KCON1=1, KCON2=0, KCON3=1, KCON4=0.

When the CPU detects an IP network failure, the user ports 1 and 2 may switch from the IP network to the PSTN and backup in different periods of time. Specifically, the switching and backup can be implemented in following ways:

For call-out, If the telephone 1 is off-hook and dials first, the CPU detects that a call request at the user port 1 according to the information sent by the detection circuits 1 and 2, sets the control signal ACON to 0 and sends the control signal ACON to the relay A, and thus the telephone 1 is switched from the IP network to the PSTN for communication. If the telephone 2 is off-hook and dials first, the CPU sets the control signal BCON to 0 and sends the control signal BCON to the relay B, and thus the telephone 2 is switched from the IP network to the PSTN.

It can be seen from the above description that, when the telephones are switched from the IP network to the PSTN, the CPU firstly switches the telephone which is off-hook and dials first to the PSTN. The other telephone can not be switched to the PSTN. However, when the conversation is over, the CPU determines whether the PSTN line is idle according to the ring status and the off-hook status sent by the detection circuits 1 and 2. If the PSTN is idle and another call request is detected, another telephone can be switched to the PSTN.

For call-in, when calls come from the PSTN and thus the two telephones ring at the same time, the telephone performing off-hook first is switched. Or when calls come from the PSTN, the telephone corresponding to the user port 1 is given a ring firstly. If no one answers the telephone within a preset amount of time, the telephone corresponding to the user port 2 is given a ring then.

In a word, when an IP network failure occurs and the number of the PSTN ports is less than that of the user ports, the telephones connected to the user ports are switched in different periods of time between the networks under the control of the CPU, thereby complementing the user communication backup.

The above shows the processes for two users switching between the IP network and the PSTN to backup in different working status by using the apparatus and the method thereof according to the present invention.

Similarly, one user or multiple users can also be switched between the IP network and the PSTN by using the apparatus and method according to the present invention.

In an embodiment of the present invention, when one user is switched between the IP network and the PSTN, only the user port 1 in FIG. 4 connects with a user such as a telephone, while the user port 2 is idle without any user connected; or the user port 1 is idle without any user connected while only the user port 2 connects with a user such as a telephone. Obviously, according to the method provided by the present invention, the telephone can be switched between the IP network and the PSTN in different status. Specifically, provided a telephone is connected to the user port 1 and the user port 2 is idle without any user connected, the telephone can be switched between the two networks by using the method provided by the present invention as well as the apparatus including the relays A and S, the switches 1 and 2, the detection circuits 1 and 2, the holding circuit 40, the transformer 41 and the capacitances C1 and C2 in FIG. 3.

Figure 6:
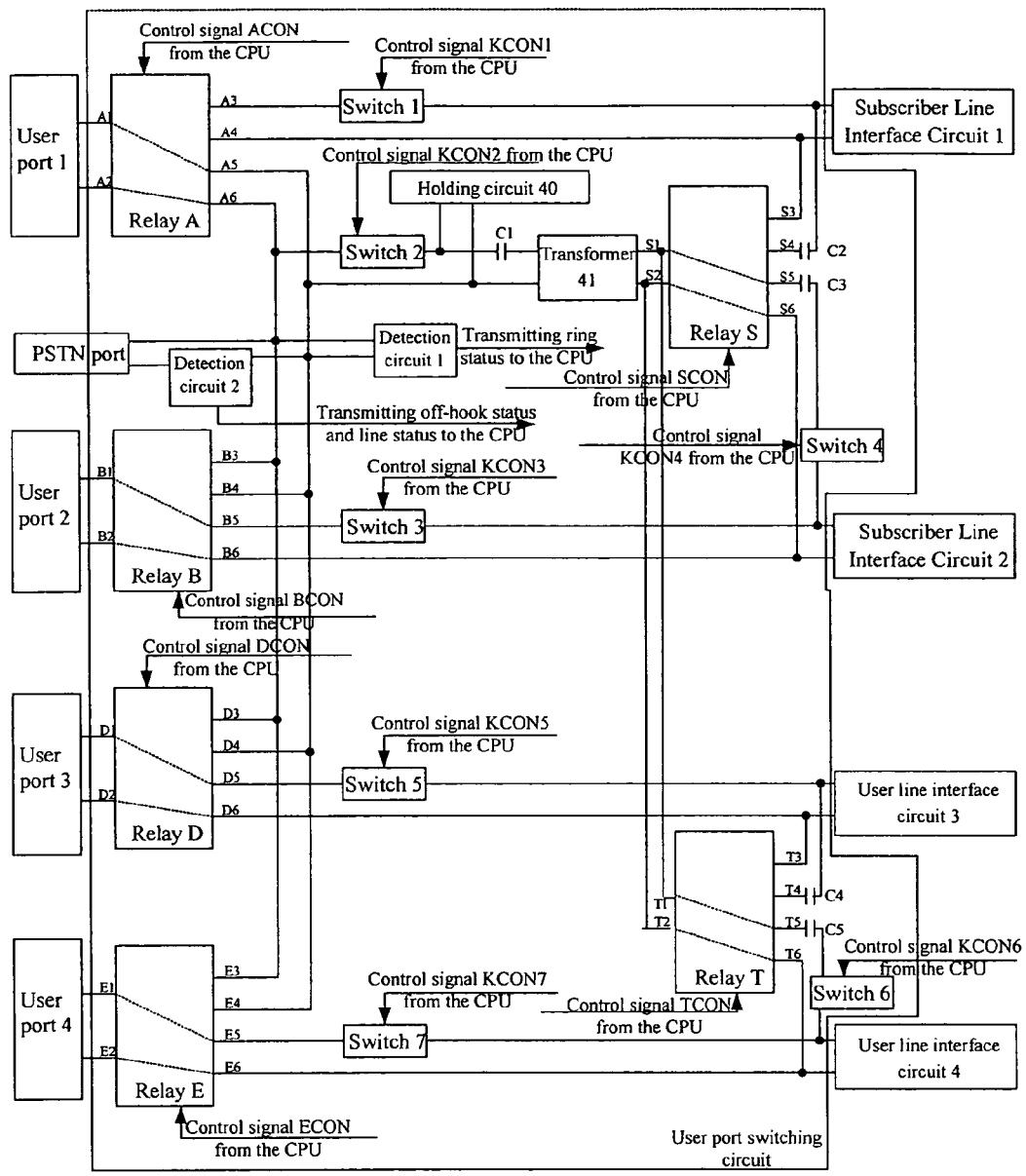
FIG. 6 is a schematic diagram of a user port switching circuit consisting of relays and photocoupler switches for connecting with four users in accordance with an embodiment of the present invention.

When multiple users need to be switched between the IP network and the PSTN, in an embodiment of the present invention, only corresponding user ports, Subscriber Line Interface Circuits, the circuits for user port switching, the access control circuits for the holding circuit and circuit DC signal separation capacitances at user line interface need to be added. Suppose two more users are added, FIG. 6 shows a user port switching circuit consisting of relays and photocoupler switches for connecting with four users. The embodiment shown in FIG. 6 is only exemplary and is not for use in limiting the scope of the invention. The relay S, for example, can be changed from single-pole double-throw to single-pole quadruple-throw instead of adding the relay T.

In an embodiment of the invention, multiple PSTN ports, e.g., two PSTN ports and four user ports, may exist. The excessive two user ports may be connected to another same circuit as the user port switching circuit shown in FIG. 4, that is, two of the four user ports share a PSTN port, and the other two user ports share the other PSTN port.

In an embodiment of the invention, the number of the user ports may be one or more. The number of the IP network interface circuits may also be one or more. Yet the number of the PSTN ports may be one or more and usually is less than or equals to the number of the user ports. The number of Subscriber Line Interface Circuits is also one or more and is equal to the number of the user ports.

In addition, the action unit 24 in the fore-going embodiments consists of physical components. In other embodiments, the action unit 24 may also consist of programmable logical chips, or logic gates, or the combination of physical components and logical components. When logical chips are employed, the action unit is established by setting up logical switches in the logical chips. Different user ports correspond to different logical switches. The status of on or off of the logical switches also corresponds to different working statuses. In different working statuses, the logical switches are controlled by the CPU sending corresponding control signals to the logical chips.

Furthermore, it also should be noted that the circuit in FIG. 2 is only a preferred embodiment of the present invention. In an embodiment of the invention, the holding circuit may not be employed when switching the user between the IP network and the PSTN, that is, the circuit in FIG. 2 performs the same function even without the holding circuit 40 and the switch 2. However, in this case, the relay A cannot be switched back to the IP network once it is switched to the PSTN, since it has to hold the analog off-hook status, and thus the user may hear the CPU dialing voice. Moreover, without the holding circuit, the telephone connects the line in parallel may attenuate the DTMF signal, thus the actual wiring distance between the Subscriber Line Interface Circuit and the PSTN user port has to be shorter. When the holding circuit exists, it functions different impedance on alternating current and DC and thus the DTMF signal may not be attenuated. Therefore, the actual wiring distance between the Subscriber Line Interface Circuit and the PSTN user port can be longer. So the switching apparatus without a holding circuit is not recommended.

The foregoing are only preferred embodiments of this invention and are not intended to limit this invention. The invention is to cover all the modifications, variations and equivalent replacements within the spirit and scope of the disclosure as defined by the appended claims.

What is claimed is:

1. An apparatus for switching between an Internet Protocol (IP) network interface port and a Public Switched Telephone Network (PSTN) port, the apparatus comprising:
   a central processing unit (CPU) configured to control a user port switching circuit in response to receiving a switching signal;
   a user port configured to couple to a user device, and the user port for generating the switching signal;
   the IP network interface port configured to access an IP network;
   the PSTN port configured to access a PSTN;
   a Subscriber Line Interface Circuit (SLIC) for coupling the user port switching circuit to the CPU;
   the user port switching circuit coupled to the CPU, the user port and the PSTN port, the user port switching circuit configured for switching the user port to a one of the IP network interface port and the PSTN port, thereby enabling the user port to access either the IP network interface port or the PSTN port, wherein the user port switching circuit further comprises,
   a detection circuit configured for detecting a line status of the PSTN port and sending the detected line status to the central processing unit,
   a holding circuit configured for maintaining an analog off-hook status on the PSTN port in response to one or more control signals from the CPU,
   wherein the CPU configured to:
   send a first control signal to a first relay of the user port switching circuit, wherein the first relay switches the user port from the IP network interface port to the PSTN port if the PSTN port is idle,
   send a second control signal to a second switch of the user port switching circuit to couple the holding circuit to the PSTN port, and in response to coupling, the holding circuit is configured to maintain the PSTN port in an analog off-hook status,
   send a third control signal to the first relay of the user port switching circuit to temporarily switch the user port from the PSTN port back to the IP network interface port,
   send a fourth control signal to a first switch of the user port switching circuit disconnecting the connection between the user port and the SLIC to prevent user from hearing dialing voices from the CPU, and
   send a fifth control signal to the first relay of the user port switching circuit, wherein the first relay switches the user port from the IP network interface port to the PSTN port enabling PSTN communication.

2. An apparatus according to claim 1, wherein the CPU is further configured to change the status of the second control signal to disconnect a connection between the holding circuit and the PSTN port.

3. An apparatus according to claim 1, further comprising a coupling & separating circuit connected in series between the holding circuit and the detection circuit, configured to coupling alternating current dual tone multi-frequency (DTMF) signals and separating Direct Current (DC) signals.

4. An apparatus according to claim 3, wherein the coupling & separating circuit comprises a transformer and a capacitance.

5. An apparatus according to claim 1, further comprising a DC-separation circuit for separating DC signal, and connected in series between the Subscriber Line Interface Circuit and the PSTN port.

6. An apparatus according to claim 1, wherein the detection circuit comprises:
   a first detection circuit for detecting ring status of the PSTN port and a second detection circuit for detecting off-hook status and line status of the PSTN port;
   an input of the first detection circuit is connected to an input of the second detection circuit while the other input of the first detection circuit is connected to one terminal of the PSTN port;
   the other input of the second detection circuit is connected to the other terminal of the PSTN port; and
   the outputs of the first detection circuit and the second detection circuit are connected to the CPU respectively.

7. An apparatus according to claim 1, wherein the user port switching circuit comprises at least one of a physical switch component and a logical component.

8. An apparatus according to claim 7, wherein the logical component comprises one of a programmable logical control chip and a circuit with control functions comprising a logic-gate circuit.

* * * * *